US 8,478,955 B1

(12) United States Patent
Natanzon et al.

(10) Patent No.: US 8,478,955 B1
(45) Date of Patent: Jul. 2, 2013

(54) VIRTUALIZED CONSISTENCY GROUP USING MORE THAN ONE DATA PROTECTION APPLIANCE

(75) Inventors: Assaf Natanzon, Ramat-Gan (IL); Yuval Aharoni, Kfar Saba (IL)

(73) Assignee: EMC International Company, Hamilton (BM)

( * ) Notice: Subject to any disclaimer, the term of this patent is extended or adjusted under 35 U.S.C. 154(b) by 445 days.

(21) Appl. No.: 12/890,928

(22) Filed: Sep. 27, 2010

(51) Int. Cl.
*G06F 12/00* (2006.01)

(52) U.S. Cl.
USPC ........... 711/162; 711/112; 711/114; 711/156; 711/158; 707/648; 707/649; 714/4.11; 714/6.3; 714/6.32

(58) Field of Classification Search
USPC .......... 711/162, 112, 114, 156, 158; 707/648, 707/649; 714/4.11, 6.3, 6.32
See application file for complete search history.

(56) References Cited

U.S. PATENT DOCUMENTS

| | | |
|---|---|---|
| 5,170,480 A | 12/1992 | Mohan et al. |
| 5,388,254 A | 2/1995 | Betz et al. |
| 5,499,367 A | 3/1996 | Bamford et al. |
| 5,864,837 A | 1/1999 | Maimone |
| 5,879,459 A | 3/1999 | Gadgil et al. |
| 5,990,899 A | 11/1999 | Whitten |
| 6,042,652 A | 3/2000 | Hyun et al. |
| 6,065,018 A | 5/2000 | Beier et al. |
| 6,143,659 A | 11/2000 | Leem |
| 6,148,340 A | 11/2000 | Bittinger et al. |
| 6,174,377 B1 | 1/2001 | Doering et al. |
| 6,174,809 B1 | 1/2001 | Kang et al. |
| 6,203,613 B1 | 3/2001 | Gates et al. |
| 6,260,125 B1 | 7/2001 | McDowell |
| 6,270,572 B1 | 8/2001 | Kim et al. |
| 6,272,534 B1 | 8/2001 | Guha |
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |
| 6,804,676 B1 | 10/2004 | Bains, II |
| 6,880,059 B2 * | 4/2005 | Mizuno et al. ................. 711/170 |
| 6,947,981 B2 | 9/2005 | Lubbers et al. |
| 7,043,610 B2 | 5/2006 | Horn et al. |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Soules et al.; "Metadata Efficiency in a Comprehensive Versioning File System", May 2002, CMU-CS-02-145, School of Computer Science, Carnegie Mellon University, Pittsburgh, PA 15213, 33 pages.

(Continued)

*Primary Examiner* — Stephen Elmore
(74) *Attorney, Agent, or Firm* — Daly, Crowley, Mofford & Durkee, LLP

(57) ABSTRACT

In one aspect, a method includes forming a virtualized grid consistency group to replicate logical units, running a first grid copy on a first data protection appliance (DPA), running a second grid copy on a second DPA, splitting to the first DPA IOs intended for a first subset of the logical units and splitting to the second DPA IOs intended for a second subset of the logical units different from the first subset of logical units.

20 Claims, 19 Drawing Sheets

U.S. PATENT DOCUMENTS

| | | |
|---|---|---|
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,146,439 B1 | 12/2006 | Ofer et al. |
| 7,159,088 B2 | 1/2007 | Hirakawa et al. |
| 7,167,963 B2 | 1/2007 | Hirakawa et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,360,113 B2 | 4/2008 | Anderson et al. |
| 7,426,618 B2 | 9/2008 | Vu et al. |
| 7,516,287 B2 | 4/2009 | Ahal et al. |
| 7,519,625 B2 | 4/2009 | Honami et al. |
| 7,519,628 B1 | 4/2009 | Leverett |
| 7,546,485 B2 | 6/2009 | Cochran et al. |
| 7,577,867 B2 | 8/2009 | Lewin et al. |
| 7,606,940 B2 | 10/2009 | Yamagami |
| 7,627,612 B2 | 12/2009 | Ahal et al. |
| 7,627,687 B2 | 12/2009 | Ahal et al. |
| 7,757,057 B2 | 7/2010 | Sangapu et al. |
| 7,769,931 B1 | 8/2010 | Angelone et al. |
| 7,774,565 B2 | 8/2010 | Lewin et al. |
| 7,797,358 B1 | 9/2010 | Ahal et al. |
| 7,844,856 B1 | 11/2010 | Ahal et al. |
| 7,849,361 B2 | 12/2010 | Ahal et al. |
| 7,860,836 B1 | 12/2010 | Natanzon et al. |
| 7,882,286 B1 | 2/2011 | Natanzon et al. |
| 7,904,681 B1 | 3/2011 | Bappe et al. |
| 7,908,515 B1 | 3/2011 | Schechner et al. |
| 7,945,640 B1 | 5/2011 | Van Tine |
| 7,958,372 B1 | 6/2011 | Natanzon |
| 7,962,567 B1 | 6/2011 | Sandstrom et al. |
| 8,108,634 B1 | 1/2012 | Natanzon et al. |
| 8,140,821 B1 | 3/2012 | Raizen et al. |
| 8,150,936 B2 | 4/2012 | Liu et al. |
| 8,166,314 B1 | 4/2012 | Raizen et al. |
| 8,205,009 B2 | 6/2012 | Heller et al. |
| 8,271,441 B1 * | 9/2012 | Natanzon et al. .............. 707/634 |
| 8,271,447 B1 | 9/2012 | Natanzon et al. |
| 8,332,687 B1 | 12/2012 | Natanzon et al. |
| 8,335,771 B1 | 12/2012 | Natanzon et al. |
| 2002/0129168 A1 | 9/2002 | Kanai et al. |
| 2003/0061537 A1 | 3/2003 | Cha et al. |
| 2003/0110278 A1 | 6/2003 | Anderson |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0195670 A1 | 8/2006 | Iwamura et al. |
| 2006/0212462 A1 | 9/2006 | Heller et al. |
| 2007/0055833 A1 | 3/2007 | Vu et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2007/0266053 A1 | 11/2007 | Ahal et al. |
| 2008/0082592 A1 | 4/2008 | Ahal et al. |

OTHER PUBLICATIONS

Soules, Metadata Efficiency in Versioning File Systems, 2003, pp. 1-16.

AIX System Management Concepts: Operating Systems and Devices May 2000, pp. 1-280.

Microsoft Computer Dictionary, 2002 Press Fifth Edition, p. 58.

Office Action dated Dec. 21, 2011, U.S. Appl. No. 12/045,946, 14 pages.

Office Action dated Jan. 23, 2012, U.S. Appl. No. 12/818,236, 17 Pages.

Office Action dated Mar. 31, 2009 for U.S. Appl. No. 11/609,560, 15 pages.

Response to Office Action filed Jun. 10, 2009 in U.S. Appl. No. 11/609,560, 18 pages.

Office Action dated Oct. 21, 2009 for U.S. Appl. No. 11/609,560, 34 pages.

Response to Office Action filed on Jan. 14, 2010 in U.S. Appl. No. 11/609,560, 16 pages.

Notice of Allowance dated Sep. 27, 2011 for U.S. Appl. No. 11/609,560, 13 pages.

Office Action dated Aug. 17, 2011 for U.S. Appl. No. 12/057,652, 19 pages.

Response to Office Action flied on Sep. 1, 2011 in U.S. Appl. No. 12/057,652, 9 pages.

Notice of Allowance dated Sep. 27, 2011 for U.S. Appl. No. 12/057,652, 8 pages.

Office Action dated Jun. 11, 2009 for U.S. Appl. No. 11/609,561, 7 pages.

Response to Office Action filed on Sep. 16, 2009 in U.S. Appl. No. 11/609,561, 12 pages.

Office Action dated Jan. 11, 2010 for U.S. Appl. No. 11/609,561, 10 pages.

Pre-Appeal Brief Request for Review filed Mar. 25, 2010 in U.S. Appl. No. 11/609,561, 6 pages.

Notice of Panel Decision from Pre-Appeal Brief Review dated Jul. 16, 2010 in U.S. Appl. No. 11/609,561, 2 pages.

Notice of Allowance dated Sep. 14, 2010 in U.S. Appl. No. 11/609,561, 7 pages.

Office Action dated Sep. 30, 2008 in U.S. Appl. No. 11/356,920, 34 pages.

Response to Office Action filed Dec. 19, 2008 in U.S. Appl. No. 11/356,920, 23 pages.

Notice of Allowance dated Apr. 20, 2009 in U.S. Appl. No. 11/356,920, 10 pages.

Office Action dated Dec. 12, 2007 in U.S. Appl. No. 10/512,687, 20 pages.

Response to Office Action filed on Jun. 9, 2008 in U.S. Appl. No. 10/512,687, 14 pages.

Office Action dated Sep. 10, 2008 in U.S. Appl. No. 10/512,687, 16 pages.

Response to Office Action filed on Dec. 9, 2008 in U.S. Appl. No. 10/512,687, 13 pages.

Advisory Action dated Jan. 7, 2009 in U.S. Appl. No. 10/512,687, 3 pages.

Response to Office Action filed on Feb. 10, 2009 in U.S. Appl. No. 10/512,687, 23 pages.

Office Action dated Apr. 3, 2009 in U.S. Appl. No. 10/512,687, 16 pages.

Response to Office Action filed on Jul. 28, 2009 in U.S. Appl. No. 10/512,687, 18 pages.

Office Action dated Nov. 18, 2009 in U.S. Appl. No. 10/512,687, 20 pages.

Response to Office Action filed on Mar. 15, 2010 in U.S. Appl. No. 10/512,687, 19 pages.

Office Action dated Oct. 20, 2011 in U.S. Appl. No. 10/512,687, 28 pages.

Response to Office Action filed on Jan. 10, 2012 in U.S. Appl. No. 10/512,687, 14 pages.

Notice of Allowance dated Apr. 27, 2012 in U.S. Appl. No. 10/512,687, 7 pages.

Office Action dated Sep. 23, 2008 in U.S. Appl. No. 11/536,215, 8 pages.

Response to Office Action filed on Nov. 19, 2008 in U.S. Appl. No. 11/536,215, 10 pages.

Notice of Allowance dated Dec. 10, 2008 in U.S. Appl. No. 11/536,216, 9 pages.

Office Action dated Aug. 19, 2008 in U.S. Appl. No. 11/536,233, 8 pages.

Response to Office Action filed on Sep. 17, 2008 in U.S. Appl. No. 11/536,233, 9 pages.
Office Action dated Oct. 27, 2008 in U.S. Appl. No. 11/536,233, 5 pages.
Response to Office Action filed on Nov. 25, 2008 in U.S. Appl. No. 11/536,233, 11 pages.
Office Action dated Mar. 6, 2009 in U.S. Appl. No. 11/536,233, 29 pages.
Response to Office Action filed on Jun. 3, 2009 in U.S. Appl. No. 11/536,233, 16 pages.
Notice of Allowance dated Sep. 16, 2009 in U.S. Appl. No. 11/536,233, 3 pages.
Office Action dated Apr. 23, 2009 in U.S. Appl. No. 11/536,160, 21 pages.
Response to Office Action filed on Jun. 9, 2009 in U.S. Appl. No. 11/536,160, 12 pages.
Notice of Allowance dated Aug. 31, 2009 in U.S. Appl. No. 11/536,160, 19 pages.
Office Action dated Mar. 25, 2010 in U.S. Appl. No. 11/964,168, 17 pages.
Response to Office Action filed on Apr. 13, 2010 in U.S. Appl. No. 11/964,168, 10 pages.
Notice of Allowance dated Jul. 8, 2010 in U.S. Appl. No. 11/964,168, 8 pages.

* cited by examiner

| Virtual Consistency Group 600 | | | |
|---|---|---|---|
| Consistency Group 0 630 | Consistency Group 1 640 | Consistency Group 2 650 | Consistency Group n-1 660 |
| Journal 635 | Journal 645 | Journal 655 | Journal 665 |
| Replication Journal 620 | | | |
| DPA 670 | DPA 672 | DPA 674 | DPA 676 |

*FIG. 6*

VIRTUALIZED CONSISTENCY GROUP USING MORE THAN ONE DATA PROTECTION APPLIANCE

BACKGROUND

Computer data is vital to today's organizations, and a significant part of protection against disasters is focused on data protection. As solid-state memory has advanced to the point where cost of memory has become a relatively insignificant factor, organizations may afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site may recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling roll back of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

In one aspect, a method includes forming a virtualized grid consistency group to replicate logical units, running a first grid copy on a first data protection appliance (DPA), running a second grid copy on a second DPA, splitting to the first DPA IOs intended for a first subset of the logical units and splitting to the second DPA IOs intended for a second subset of the logical units different from the first subset of logical units.

In another aspect, an article includes a machine-readable medium that stores executable instructions. The instructions cause a machine to form a virtualized grid consistency group to replicate logical units, run a first grid copy on a first data protection appliance (DPA), run a second grid copy on a second DPA, split to the first DPA IOs intended for a first subset of the logical units and split to the second DPA IOs intended for a second subset of the logical units different from the first subset of logical units.

In a further aspect, an apparatus includes circuitry to form a virtualized grid consistency group to replicate logical units, run a first grid copy on a first data protection appliance (DPA), run a second grid copy on a second DPA, split to the first DPA IOs intended for a first subset of the logical units and split to the second DPA IOs intended for a second subset of the logical units different from the first subset of logical units.

One or more of the aspects above may include one or more of the following features. One features includes receiving IOs at the first data appliance intended for a logical unit of the first subset, checking an offset of the IO, forwarding the IO to the first grid copy if the offset of the IO belongs to a first set of offsets and sending the IO to the second grid copy for handling if the offset of the IO is in the second set of offsets. This feature may include splitting IOs for which the offsets of the IO cross slices.

Another feature includes generating a unique bookmark based on an ID. Generating a unique bookmark ID may include generating a unique ID based on one of a user request or an amount of time. Generating a bookmark may also include sending a command from the first grid copy to each of the grid copies to cease acknowledging IOs; and after send command is acknowledged, sending a bookmark with the unique ID from the first grid copy to each grid copy and sending a resume command to acknowledge IOs with an approval of the bookmark if all bookmarks are acknowledged. This feature may further include receiving at a grid copy the command from the first grid copy to cease acknowledging IOs, ceasing acknowledging IOs, determining if the bookmark with the unique ID is received in a predetermined amount of time, forwarding the bookmark with the unique ID to a journal, sending a status of the bookmark command to the first grid copy, determining if a resume command with approval of the bookmark with the unique ID is received in a predetermined amount of time, forwarding the approval with the unique ID to a journal and resuming acknowledging the IOs. This feature may still further include resuming acknowledging IOs if the bookmark with the unique ID is not received at the second grid copy in the predetermined amount of time and preventing forwarding of the bookmark and the approval command with the unique ID.

A further feature includes collecting status of the activity of the logical units (LUs), performing an optimization algorithm and exposing LU which grid copy should expose which LUs. This feature may also include ceasing exposing logical units by the first and second grid copies and re-exposing the logical units based on the optimization algorithm.

Still further features include using the first grid copy to maintain a first delta marking stream, using the second grid copy to maintain a second delta marking stream, receiving a request to flush data from the first and second marking streams, using the first grid copy to flush data from the first delta marking stream to a disk and using the second grid copy to flush data from the second delta marking stream to the disk. Another feature include using the first grid copy to maintain a first marking stream, receiving a request to flush data from the marking stream receiving at the first grid copy marking data from the second grid copy and using the first grid copy to flush data from the delta marking stream to a disk.

The aspects above may include reading a delta marking stream from the first and second grid copies. The aspects above may also include using bookmarks approved by each grid copy, verifying that bookmark are for the same point in time according to the bookmark unique ID and presenting a time of the bookmark stored on the first grid copy. The aspects above may further include exposing the LUNs to a point in time requested by a user in logged access mode, rolling all copies to the point in time the user requested, exposing a set of LUNs for each grid copy and forwarding the write IO request to a correct grid copy. The aspects above may include creating a virtual access point for the first and second grid copies, exposing a set of LUNs for each grid copy and forwarding the read and write IO requests to a correct grid copy.

DESCRIPTION OF THE DRAWINGS

FIG. 6 is a block diagram of further example of the virtual consistency group.

DETAILED DESCRIPTION

Figure 1:
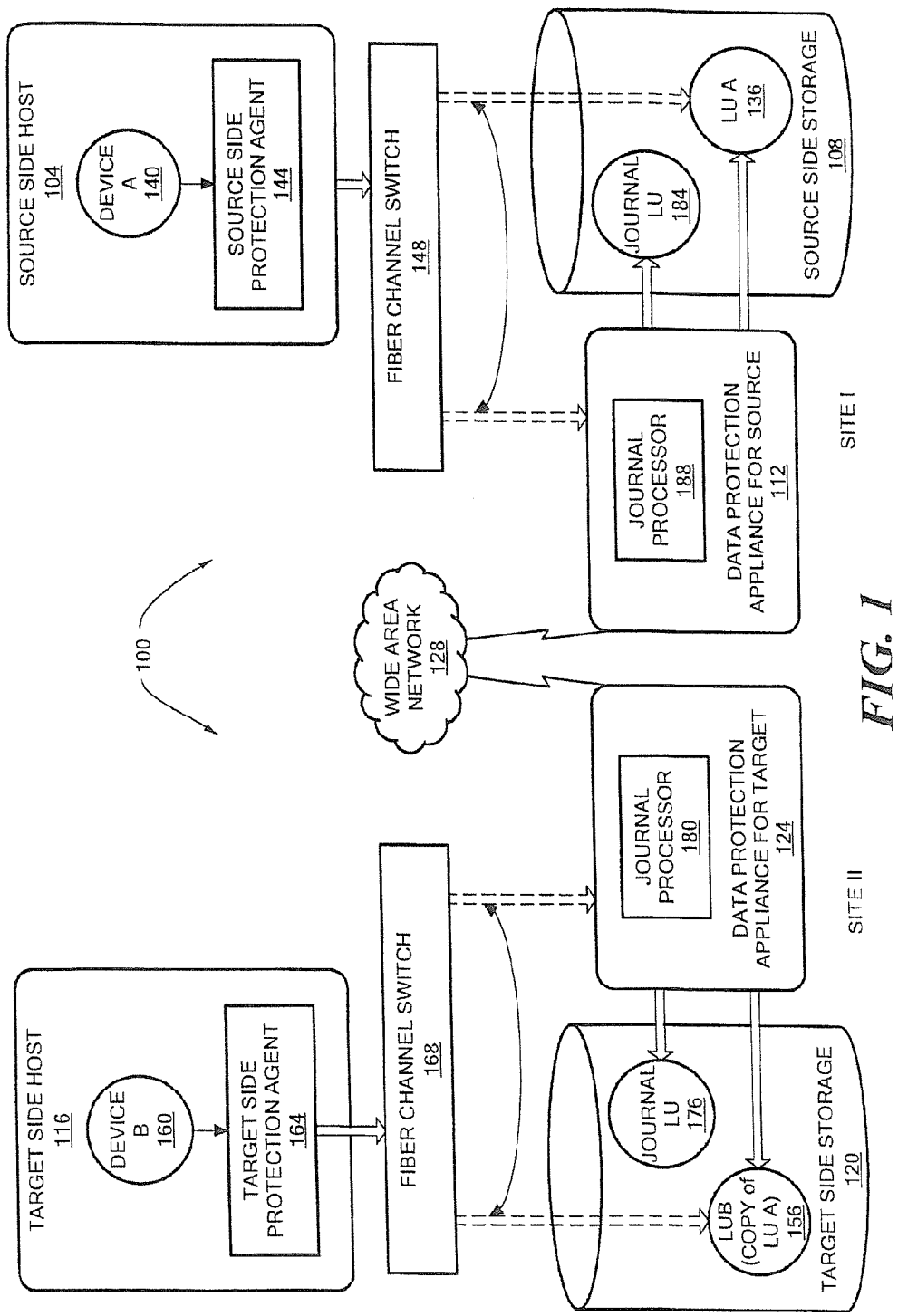
FIG. 1 is a block diagram of an example of a data protection system.

Described herein are various techniques to replicate data using consistency groups. Replication of one consistency group may be across several replication appliances (called herein data protection appliances (DPA)). In one example, volumes may be striped. Each volume may be presented as a set of stripes striped volume. A new virtual CG may be formed which may include several internal CGs. The virtual CG may be presented to the user and the user may be able to perform all actions on the virtual CG. Internally, in some examples, each internal CG may replicate only some of the stripes of the volumes. As well a consistency point may be achieved across internal CGs. That is, it may be possible to form an image of a particular time by rolling each internal CG group to that time. In some examples, the internal CGs may not be exposed to the user and all actions happen automatically on the internal CGs when performed on the virtual CG. Internal CG groups may also be referred to as Grid Copies. In a further example, one box may be accepting all the IOs, this box will split the IOs between relevant boxes running the consistency groups.

Typical replication technologies either run in the array or run on network or host. Conventional array based technologies are limited to the internal array and are homogenous, network technologies limited to replicating whole LUs (logical units). The typical arrays have trouble replicating a high performance environment in a single consistency group, or have trouble with real time load balancing. Current host based replication is usually limited, intrusive and cannot replicate data shared in clusters. Conversely, the current specification, in some examples, enable load balancing though the volume virtualization and enables high performance replication using clusters of replication devices.

The following definitions may be useful in understanding the specification and claims.

BACKUP SITE—a facility where replicated production site data is stored; the backup site may be located in a remote site or at the same location as the production site;

Data Protection Appliance (DPA)—a computer or a cluster of computers responsible for data protection services including inter alia data replication of a storage system, and journaling of IO requests issued by a host computer to the storage system;

CG—consistency group—a set of logical units (LUs) which are replicated together for which write order fidelity is preserved.

Grid MCG—a Consistency group that may be replicated across several DPA this is the Consistency Group that is presented to the user Grid ICG—a part of the grid Consistency Group that is replicated by one DPA Marking Box—the DPA that runs the grid ICD which accepts all the data and splits it to the relevant boxes.

HOST—at least one computer or networks of computers that runs at least one data processing application that issues IO requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues IO requests;

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SPLITTER ACKNOWLEDGEMENT—an acknowledgement from a DPA to the protection agent that data has been received at the DPA, this may be achieved by SCSI status cmd.

SAN—a storage area network of nodes that send and receive IO and other requests, each node in the network being an initiator or a target, or both an initiator and a target;

SOURCE SIDE—a transmitter of data within a data replication workflow, during normal operation a production site is the source side; and during data recovery a backup site is the source side;

STORAGE SYSTEM—a SAN entity that provides multiple logical units for access by multiple SAN initiators TARGET—a node in a SAN that replies to IO requests;

TARGET SIDE—a receiver of data within a data replication workflow; during normal operation a back site is the target side, and during data recovery a production site is the target side;

WAN—a wide area network that connects local networks and enables them to communicate with one another, such as the Internet.

REMOTE ACKNOWLEDGEMENTS—an acknowledgement from remote DPA to the local DPA that data arrived at the remote DPA (either to the appliance or the journal)

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

An Example of a Replication System

Referring to FIG. 1, a data protection system 100 includes two sites; Site I, which is a production site, and Site II, which is a backup site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (splitter) may run on the host, or on the storage, or in the network, and that DPAs are optional and DPA code may run on the storage array too.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an IO interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues IO requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an IO rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of IO requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

DPAs 112 and 124 are configured to act as initiators in the SAN; i.e., they can issue IO requests using, for example, SCSI commands, to access logical units on their respective storage systems. DPA 112 and DPA 124 are also configured with the necessary functionality to act as targets; i.e., to reply to IO requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits IO requests issued by a host computer to the host device corresponding to that logical unit. Similarly, when a DPA behaves as a target device for a certain logical unit, then during normal course of operation, the associated protection agent fails IO requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI IO write requests. A replicated SCSI IO write request is sent to DPA 112. After receiving an acknowledgement from DPA 124, protection agent 144 then sends the SCSI IO write request to LU A. Only after receiving a second acknowledgement from storage system 108 will host computer 104 an IO command complete.

When DPA 112 receives a replicated SCSI write request from data protection agent 144, DPA 112 transmits certain IO information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each IO request, before receiving an acknowledgement back from DPA 124.

In snapshot mode, DPA 112 receives several IO requests and combines them into an aggregate "snapshot" of all write activity performed in the multiple IO requests, and sends the snapshot to DPA 124, for journaling and for incorporation in target storage system 120. In snapshot mode DPA 112 also sends an acknowledgement to protection agent 144 upon receipt of each IO request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending IO requests to LU B. To prevent such IO requests from being sent, protection agent 164 acts as a target site protection agent for host Device B and fails IO requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Figure 2:
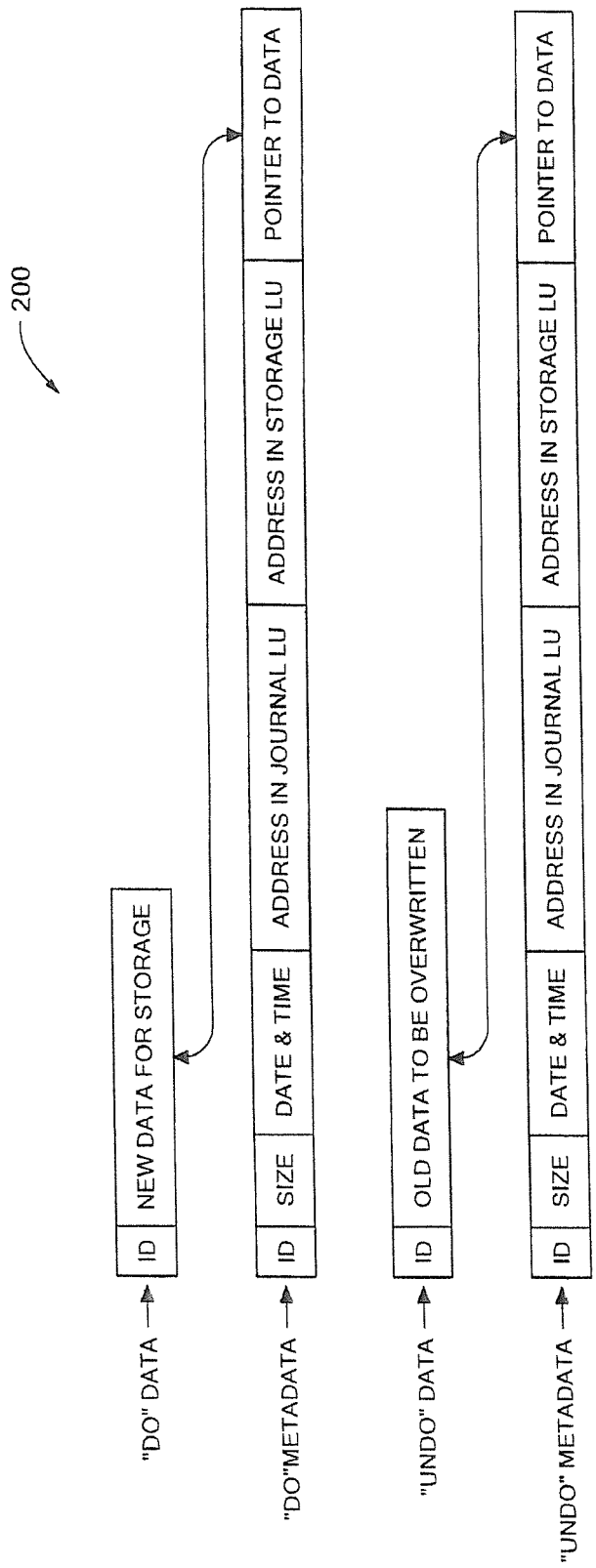
FIG. 2 is an illustration of an example of a journal history of write transactions for a storage system.

Referring to FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself. Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

Virtualized Consistency Groups

A virtualized Consistency Group may be used to present a single Consistency Group which may span several different appliances. In some examples, forming one large consistency group is achieved by n internal consistency groups or grid copies. Each grid copy may have the same configuration as the original consistency group, i.e. user volumes and journal volumes. Each internal CG may be called a Grid Copy.

Figure 3:
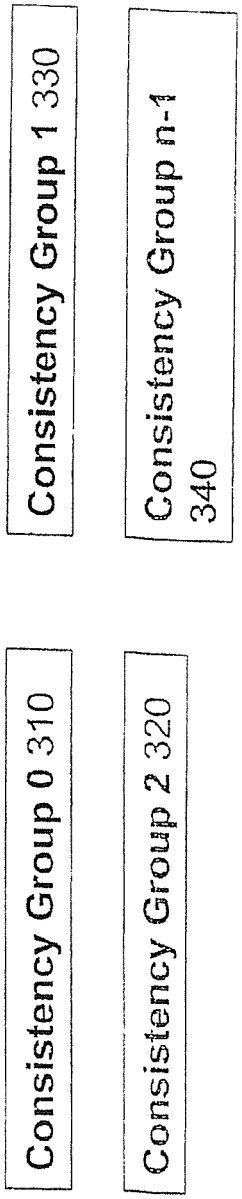
FIG. 3 is a block diagram of an example of consistency groups.
Figure 4:
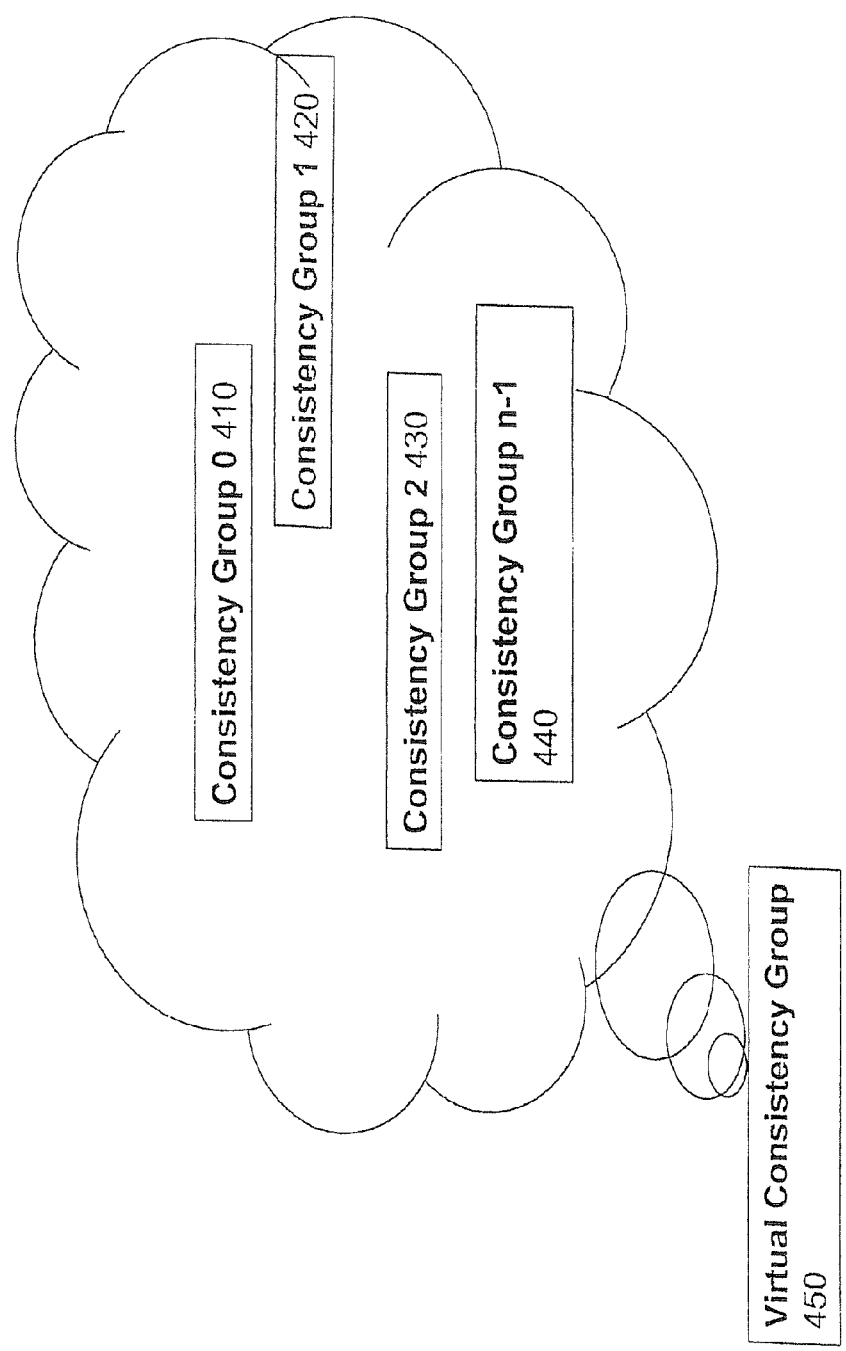
FIG. 4 is a block diagram of an example of a virtual consistency group.

The grid copies may be numbered 0, . . . , n−1 where grid copy zero may be a special grid copy. For example refer to FIGS. 3 and 4. FIG. 3 illustrates a sample internal consistency groups or grid copies, consistency group 310, 320, 330 and 340. FIG. 4 illustrates how these consistency groups 410, 420, 430, and 440 may be used to create a virtual consistency group 450.

Figure 5:
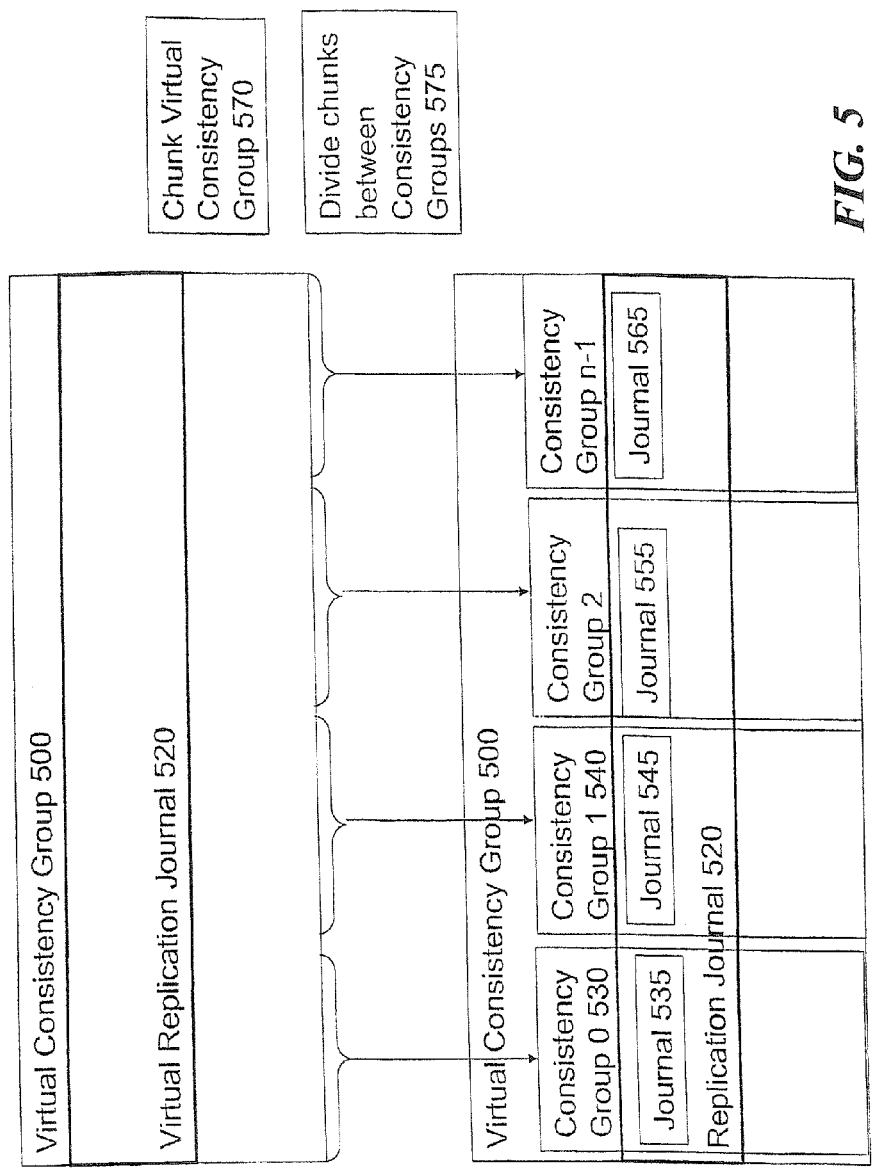
FIG. 5 is a block diagram of another example of the virtual consistency group.

Referring to FIG. 5, a Virtual Consistency group 500 is shown. This Virtual consistency group 500 may have a virtual replication journal 520 and may be presented to the user. In some examples, the virtual journal, such as virtual journal 520 may be created by the user. The Virtual Consistency group may include several consistency groups or grid copies, such as grid copies 530, 540, 550, and 560. These grid copies may each be responsible for a portion of the replication handled by the consistency group. As well, each grid copy may have a journal, such as journals 535, 545, 555, and 565 which may correspond to a piece or segment of the replication journal 520 of the virtual consistency group 500. The user volumes of consistency group 500 are chunked 570 and divided 575 between the grid copies.

Referring to FIG. 6, each grid copy can run on a different Data protection appliance such as DPA 670, 672, 674, and 676. As well, a DPA may run multiple grid copies. Each grid copy may contain a portion of the virtual replication journal 620 for a replication of a volume or multiple volumes. That is, each grid copy, 630, 640, 650, and 660 may be responsible for recording a portion of the journal 620, which corresponds to a portion of the replication of the virtual consistency group 600. Replication of user volumes may be divided into sections and each grid copy, 630, 640, 650, and 660 may be responsible for an equal section, each grid copy may be responsible for replicating its portion of the user volumes and every grid copy may create its own journal curved from the global journal. The grid copy may use the piece of the journal corresponding to that section, such as Journals 635, 645, 655, and 665, to generate a DO stream and UNDO stream for each section.

Figure 7:
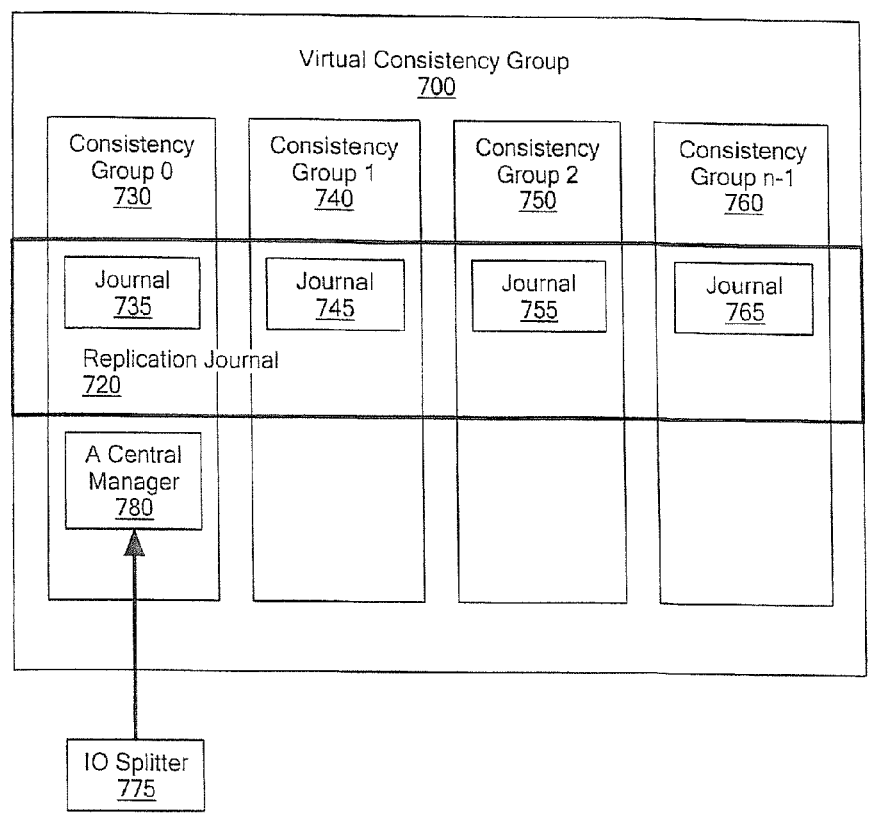
FIG. 7 is a block diagram of an example of the virtual consistency group receiving IO.

Referring to FIG. 7, the virtual consistency group 700 includes grid copies 730, 740, 750 and 760 and may be responsible for recording a portion of the journal 720. The grid copy may use the piece of the journal corresponding to that section, such as Journals 735, 745, 755, and 765, to generate a DO stream and UNDO stream for each section. The consistency group 0 730 (grid copy 0) includes a central manager 780.

The grid copy zero 730 may be different from other grid copies as it may manage the accounting for virtual consistency group. That is, all IO from the splitter 775 may be directed to the grid copy zero. Further, the virtual consistency group 700 may be used for replication of a single volume. As well, the virtual consistency group 700 may be used to replicate multiple volumes. In one example, the virtual consistency group 700 may represent any number of underlying consistency groups, grid copies, or DPAs, however the virtual consistency group may be presented to the user as a single consistency group.

Splitting Data

All IOs from the splitter 775 may arrive at grid copy zero 730. This grid copy 730 may handle the marking of the data, where marking may mean the tracking of changes to the data. The user volume or volumes to be replicated by the virtual consistency group may be divided into chunks, where each chunk may be handled by a different grid copy of the virtual consistency group. In some examples, grid copy zero may be responsible for sending the IOs to the correct grid copy, the grid copy group may also handle the IO. The grid copy group may compress the data and may send it to the replica site where it may be written to the relevant journal. This may include grid copy zero splitting IOs into two or more parts when necessary.

Figure 8:
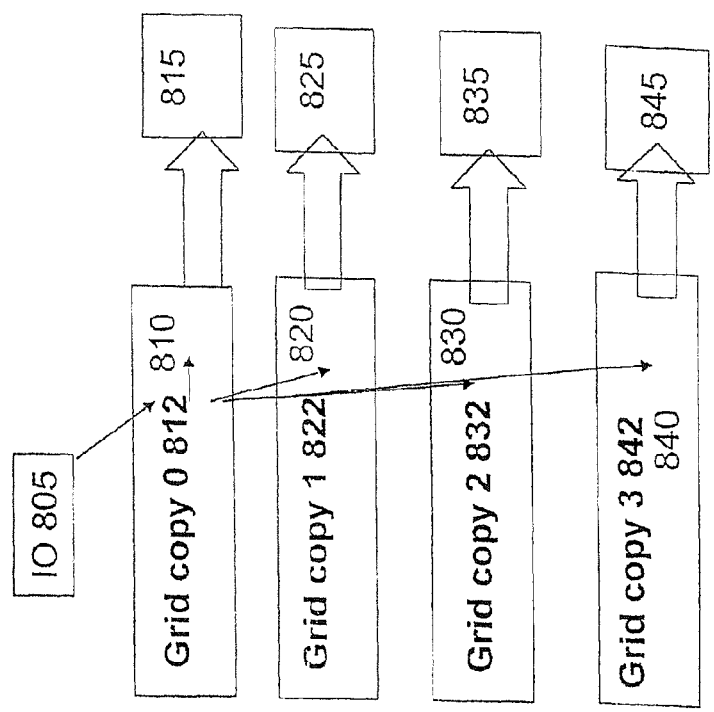
FIG. 8 is a block diagram of another example of the virtual consistency group receiving IO.

Referring to FIG. 8, IOs 805 reach appliance 810 of grid CG 0. Grid copy zero 812 receives the IO 805. Grid copy zero 812 may send the IO it to the DPAs, such as DPA 820, 830, and 840, which hold the grid CGs 822, 834, and 842, relevant to the IO. In some examples a single DPA may store multiple grid copies and IO for the multiple grid copies may be sent to a single DPA. Each grid copy may handle the IO, for example compress the IO and sending the IO to remote, such as remotes 815, 825, 835, and 845, and on the remote site write it to journal. As well, IOs may be transferred from grid copy zero to other grid copies on a first medium, for example small computer system interface (SCSI) over fiber channel, and data from each grid copy to its replica counterpart may be transferred on another medium such as Internet Protocol (IP), or vice versa.

In some examples, a marking stream may be a stream of metadata, containing volume ID, offset and length. The marking stream may be used to track the difference between a production and a replica site, allowing to resynchronization of portions of the data, in case the replication process stopped, for example because of a wan problem or other problem causing connectivity problems. The metadata stream may be persistently stored on the journal of the production site. The marking stream may be maintained by grid copy 0.

Freeing data from the marking stream may be done when data arrives to both production and replica copies, thus data can be freed from the marking stream, when data reaches the production storage and all remote virtual CGs, the algorithm will free until the minimum of the point is reached in the remote copies.

Bookmark Creation

In further examples, the grid copy zero may also responsible for creating consistent points in time bookmarks across all the grid copies, grid copy zero may do so by sending a message every second to all grid copies with the same time stamp. The message may arrive to all grid copies and creates a barrier which may enforce consistency. A bookmark may be created by adding a small message to the journal of each grid copy.

For example, in some examples, grid copy zero will send a time stamp to each grid copy. Each grid copy may use this time stamp to mark time in the journal for that grid copy. As well, each grid copy may use this time stamp to roll forward and backward in the journal. That is, the time stamp allows the grid copy to apply do and undo metadata to reach a particular image for the portion of the replication it maintains. As well, bookmarks may also be created on user demand.

Journal

For a replicated volume or volumes, the journal for the replication may be striped across each grid copy. The journal volumes may create a virtual striped space, each grid copy may get specific portions of the space, on which the grid copy may handle its journal. As well, the journal of each grid copy may manage its own list of snapshots. Referring back to FIG. 5A, the Virtual Consistency group 500 has a virtual journal 520. The virtual journal 520 may be made up of the journals 535, 545, 555, and 565 of the grid copies 530, 540, 550, and 560. Referring again to FIG. 5A, each grid copy may maintain a journal which corresponds to a segment of the virtual journal.

Figure 9:
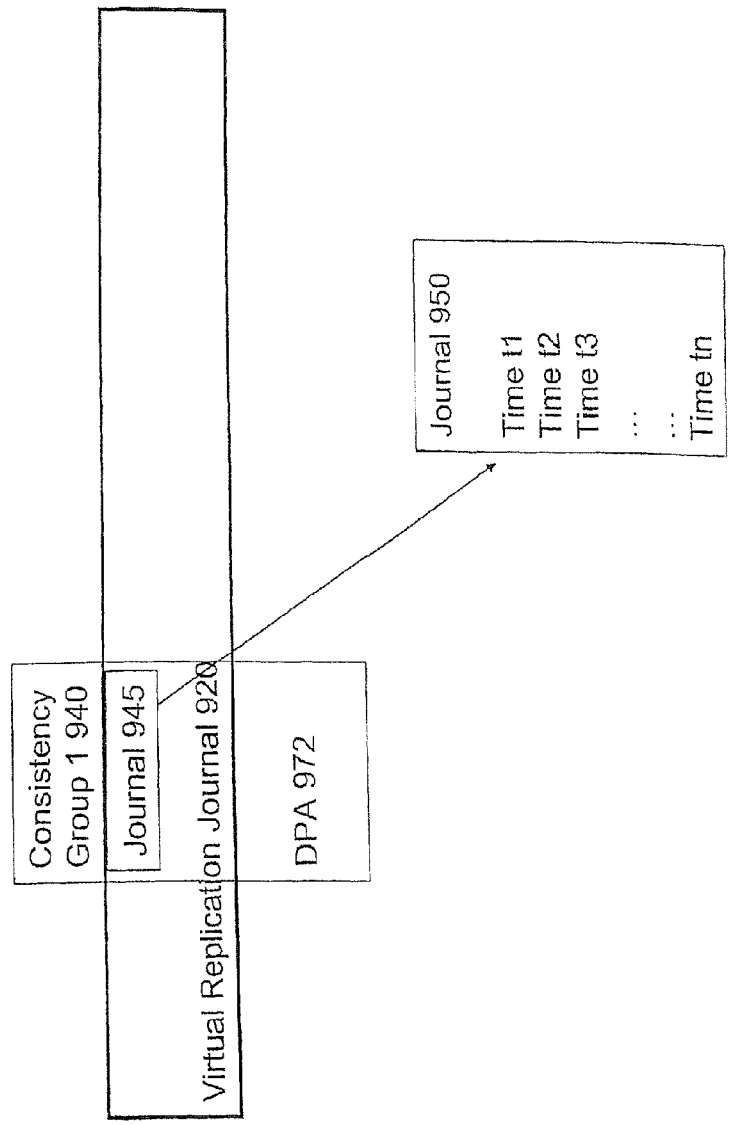
FIG. 9 is a block diagram of a time stamps on the journal of a gird copy.

Referring to FIG. 9, each journal, such as journal 950, on a grid copy, such as grid copy 940, may keep track of time increments for the journal. This allows each grid copy to roll the replication image forward and backward to reach a particular image. In some examples, when all grid copies of a virtual consistency group rolls the image back to a particular point in time Tz, the virtual consistency group may present the image of the replication for the virtual consistency group at time Tz. In some examples, the timestamps may be maintained within the journal do and undo streams.

Initialization

The initialization process may be independent for each grid copy of the Virtual Consistency group. Each grid copy may perform the initialization at a different rate, depending on the resources present on the appliance on which the grid copy is running. In some examples, each grid copy may have partial release information for each copy in the delta marking. The partial release information may denote the status reached in the initialization for that grid copy. If the initialization were to fail or crash, when the initialization is restarted, the copy may use the partial release information to resume the initialization from the point it reached before failure.

Figure 11:
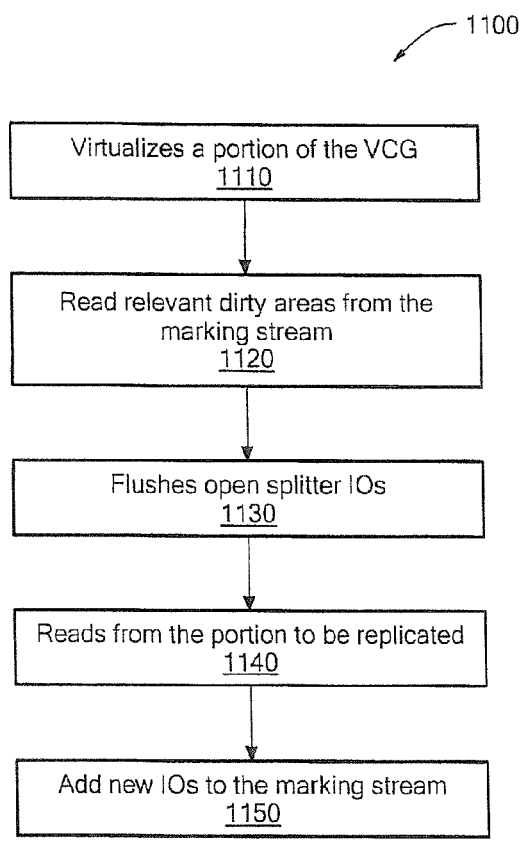
FIG. 11 is a flowchart of an example of a process to perform initialization.
Figure 12:
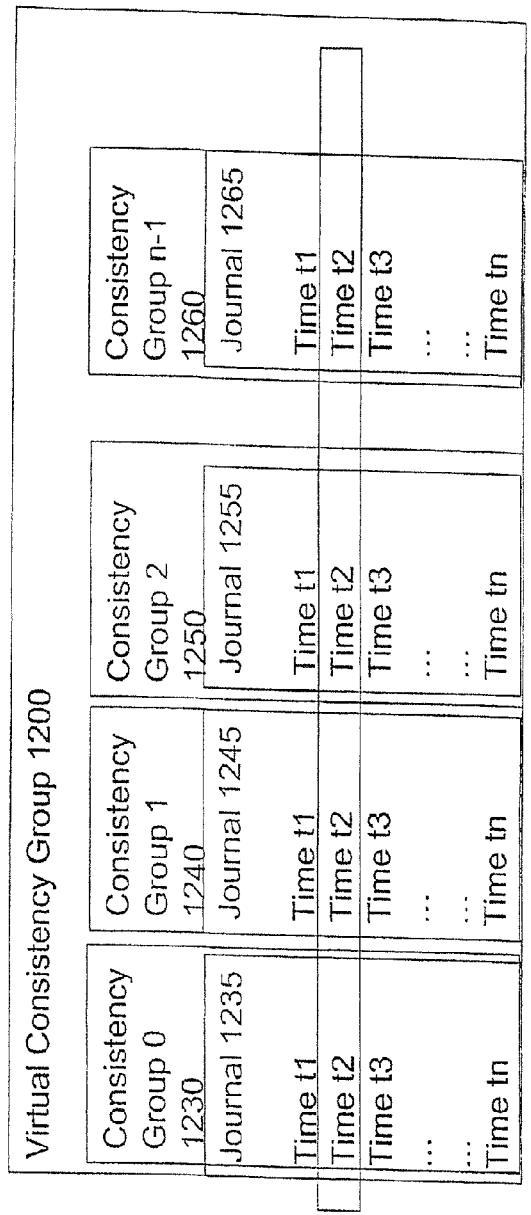
FIG. 12 is a block diagram of time stamps across grid copies of a virtual consistency group.

Referring to FIG. 11, initialization (e.g., a process 1100) may have each grid copy virtualizes 1110 the area it is responsible for replicating. For example, if a single volume is being replicated, this volume may be split between the number of grid copies, where each grid copy may receive an equal amount of the volume to replicate. If there are two grid copies, each grid copy may get half the volume, if there are four grid copies, then each grid copy may replicated one fourth of the volume. If there are multiple volumes or consistency groups to be replicated, then each the information to be replicated may still be divided between each of the grid copies.

In one example, each grid copy may read 1120 the relevant dirty areas from the marking stream of grid copy zero, for the portion of the volume or volumes it is currently synchronizing. The marking stream may contain the portion of the replication that has changed and needs to be updated. As well, each grid copy may only read the portion of the marking stream that corresponds to the portion of the replication which it is replicating.

In some examples, each grid copy may flush 1130 open splitter IOs, so that all newer IOs will reach the grid copy while initializing. This will enable each grid copy to know all the dirty portions of the replication. In further examples, after the flushing is done, the grid copies may start reading 1140 local volumes independently from grid copy zero.

In another example, new IOs may be added 1150 to the marking stream of copy 0. In other examples, the partial release info may be saved per grid copy as the initialization progresses and may includes the virtual location reached during the initiation process and what location was reached in the marking stream.

Take an example, where an initialization was occurring and there were only 2 consistency groups in the virtual consistency group. In this example, consistency group 0 had processed 60 percent the initialization while Consistency group 1 had processed 20 percent of the of the initialization task. When the initialization is restarted, consistency group 0 may continue where it left off using the partial marking and need no processes the 60 percent that it had already processed. As well, consistency group 1 may start processing at the remaining 80 percent that it has not yet processed. In addition, since the crash, new IO may have been recorded. Each consistency group will recognize and process this additional IO as well. The partial release may have two dimensions: the point up to which the marking stream has completed the init and the portion of the volumes completed, the partial release info may contain several points for each CG.

Figure 10:
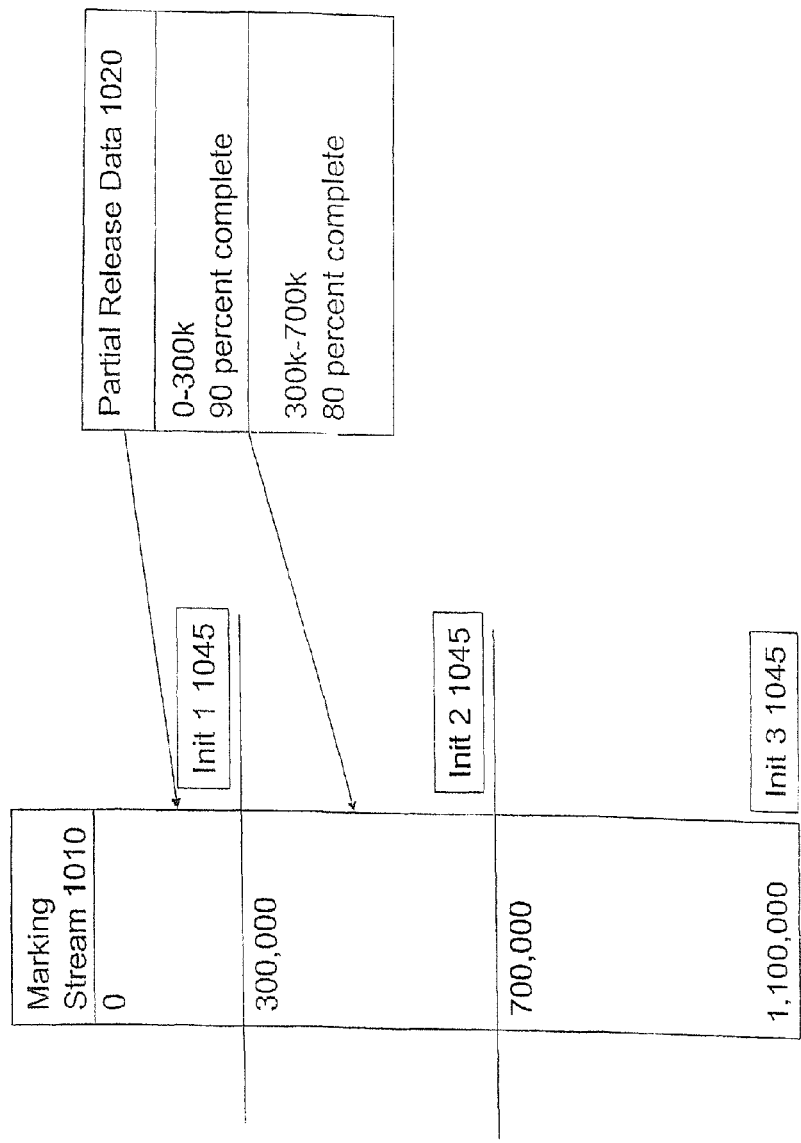
FIG. 10 is a block diagram of partial release data.

Referring to FIG. 10, during a first initialization, the partial release info may indicate that the initialization completed 90% of the volume until entry 300,000. During a second initialization 80% may have been completed until entry 700, 000. During initialization 2, the dirty entries from the marking stream 1010 may be read, each entry in the first 300,000 which is in the first 90% of the volume will be ignored. During an initialization 3, each entry which is in location 300,001 to 700,000 which is in the first 80% of the volumes will be ignored, all entries from 700,001 will be sent to replica.

The partial release info 1020 may contain a list of pairs, the size of the list is up to the number of times the initialization failed to complete. In the first initialization, which finished 90% when it crashed, the number of entries at the time of the crash was around 300,000 (the 90%, 300,000) is what may have been acknowledged. The second initialization ignored IOs in the first 300,000 entries of the marking stream which are to the first 90% offset of the volumes replicated. The second init completed 80% and the number of entries during the crash was 700,000. There may have been more marking entries, but acknowledgements were received for synching 80% of the first 700,000. A further initialization may have been started and reached 85% completion.

The entry list is for these three initializations may be 1. 90%, 300,000, 2. 80%, 700,000, and 3. 85%, 1,100,000. Entry 3 may mean that all entries which are in the first 1,100, 000 entries, which offset is less then 85% of the volume can be ignored, which include entry 2, but not cover all entry 1, if for instance the last init got to 91%, then entry 1 may also be obsolete.

Image Accessing

Figure 13A:
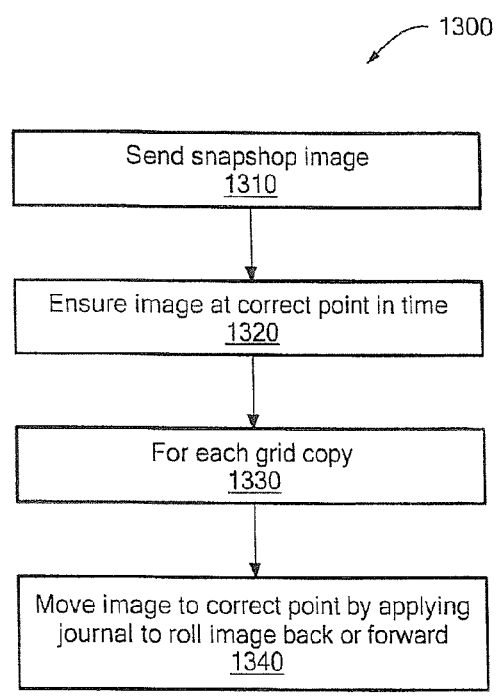
FIG. 13A is a flowchart of an example of a process to save and access a point in time snapshot.

In some examples, to access an image of the virtual consistency group, each grid copy may need to create an image the same point in time. Referring to FIG. 13A, for a process 1300, a snapshot message may be sent 1310 to all grid copies. Each grid copy may ensure 1320 that it is at the same correct point of time to create a consistent remote image. In some examples, accessing a point in time may require that each grid copy 1330 roll the image to the appropriate bookmark in the journal of the grid copy 1340.

After the image is created, user may access the volume in virtual or logged access mode In one example, the image and the access point may be created in logged accessed mode, where mode read IOs may be sent from the directly to the volume, while write IOs may be sent to grid copy zero, which will forward the IO to the correct grid CG or split the to several parts sending them to the relevant Grid CGs, if IO corresponds to areas in the volume handled by more than one grid CG. When IO handling is completed the grid copy (i.e., the undo data of the IO was written to the logged access undo journal) may tell grid copy zero that IOs completed and grid copy may return the SCSI status command to the splitter which will be able to complete the IO, if the IO was split to several grid Copies, the status will be returned only when all grid copies completed handling it.

In virtual access mode both reads and writes of the volume may be redirected to grid copy zero, which may redirect the IO to the correct grid copy, which may complete the IO, acknowledge grid copy zero, which may return the SCSI status back. In some examples, one IO may be split to several IOs, if the IO is to locations which are handled by more then one grid copy. For example if the grid stripe length is 1 MB, and IOs with size more than 1 MB arrived, the IO may be split to more then one grid copy. Also an IO of size of two blocks may be split if it is written to a boundary between grid copies The status command in target side processing (TSP) and virtual mode may also achieved by a bound, since many IOs may arrive from the splitter in parallel in access mode, the DPA may give each logged/virtual access IO a timestamp, a status for the IO may be return only when all IOs will lower timestamps completed, otherwise the status command will be delayed.

Bookmarks

For example, using a 1 second granularity a message be send for every second, and each grid copy may place a bookmark in the journal copy corresponding to this point in time. When a request for a particular point in time is received, the grid copy may create an image for this request by rolling forward or backward in the journal based on the point.

For example, referring back to FIG. 10, it is desired to have an image from time T=2. This may mean it is necessary to have each consistency group roll the image either forward or backward in time to create an image at time T=2. In FIG. 10, time T=2 has been highlighted and all consistency groups may apply the journal streams to arrive at time T=2.

Snapshot List

The DPA may hold a list of n selected snapshots, where n=1000. As there may be many grid copies in the virtualized CG, each grid copy may hold a different list of 1000 snapshots. The presented list of snapshots may be the intersection of the list of snapshots of all the grid copies. This may be because the list of 1000 snapshots is a selected list and it may be necessary to make sure the selection algorithm of each copy works the same. During a disaster, a message may arrive at one grid copy and not another. In this case, it may not be assumed that the lists are identical.

Figure 13B:
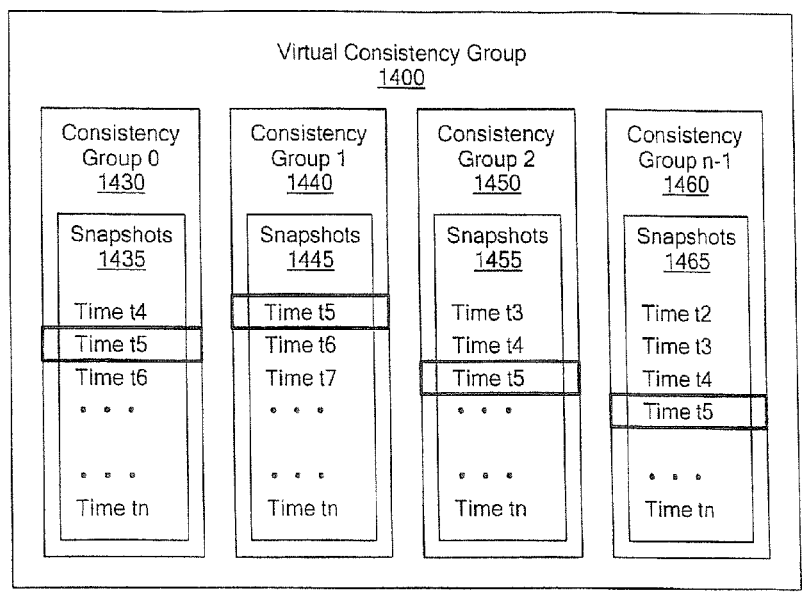
FIG. 13B is a block diagram of another example of time stamps across grid copies of a virtual consistency group.

Referring to FIG. 13B, the lists of the snapshots 1435, 1445, 1455, 1465, may not be identical and a smart selection algorithm exist may be applied. Each snapshot may get a snapshot ID, which may be an integer.

In some examples, the selection algorithm may keep the snapshot list with at most 1000 entries. When a new entry arrives, the selection algorithm may remove one entry from the list. The entry that may be removed may be the one with the lowest priority. In some examples, user bookmarks have the highest priority. In other examples, a system bookmark with odd bookmark IDs may have the lowest priority than snapshots with even ID not dividable by 4, than not dividable by 8; this type of deletion may maintain an equal distance between bookmarks. In some examples, if all the bookmarks have the same priority, selection may be made to ensure that the distance between bookmarks in terms of data is almost the same; that the delta between bookmarks is minimized. In other examples, it may be stated that the 10 bookmarks most recent bookmarks may not allowed to be diluted.

Splitting Data

Another option to leverage virtualized CG is to have more symmetry between the grid consistency groups. In particular instead of having grid copy 0 handling all the IOs, each grid copy is responsible for handling the IOs for some of the volumes of the CG (however, if the CG had only one volume the solution will be identical to the techniques previously described herein). In one example, if there are two grid copies and four logical units (e.g., a LU 1, a LU 2, a LU 3 and a LU 4) a grid copy 0 may handle all the IOs arriving to LU 1 and LU 2, while grid copy 1 may handle all IOs arriving to LU 3 and LU 4. While the examples used herein include two grid copies one of ordinary skill in the art would recognize that any number of grid copies may be used.

Each grid copy will then forward IOs it receives according to the offset of the IO to the correct grid copy responsible for handling the IO. In one example, there are two grid copies (a grid copy 0 and a grid copy 1) and four logical units (e.g., LU 0, LU 1, LU 2, LU 3). Grid copy 0 is responsible for intercepting IOs for LU 0, LU 1, grid copy 1 is responsible for intercepting LU 2, LU 3. Each LU is subdivided into slices and a slice size is 2048 blocks. In one example, odd slices (e.g., slice 1, slice 3, slice 5, slice 7, slice 9, slice 11 and so forth) of each LU are handled by grid copy 0, and even slices (e.g., slice 2, slice 4, slice 6, slice 8, slice 10, slice 12 and so for the) are handled by grid copy 1. In other examples each virtualized CG may have more than 2 grid copies, and slice size may be different.

If there is an IO to LU 1 offset 2056 size 100 and if an IO is received by the grid copy 0 (since grid copy 0 receives the IOs for LU 1), the IO is then forwarded to grid copy 1, since the IO is to the second slice (i.e., the first slice is on blocks 0 to 2047, second slice on blocks 2048-4095, third slice on blocks 4096-6144). If another IO to LU 2 offset 4090, size 20, the IO will be handled by grid copy 1 (LU 2) and the IO will be split in two:

1. Offset 4090, size 6 is sent to grid copy 1 (since this is in the second slice)
2. Offset 4096, size 14 sent to grid copy 0 (since this is the third slice).

Figure 14:
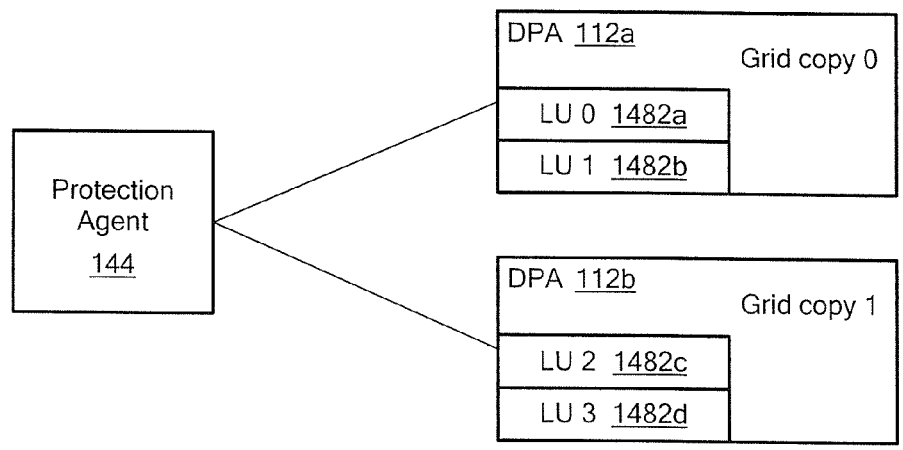
FIG. 14 is a block diagram of a protection agent and data protection appliances.

Referring to FIG. 14, the source side data protection agent 144 (e.g., a splitter) sends IOs to one or more DPAs (e.g., a DPA 112a and a DPA 112b). In one example, a virtualized grid consistency group replicates a LU 0 1482a, a LU 1 1482b, a LU 2 1482c and a LU 3 1482d. In particular, a grid copy 0 runs on the DPA 112a and the DPA 112a is configured to receive splitter IOs for LU 0 1482a and LU 1 1482b. For example, IOs the DPA receives are not the IO for the LUNs. In particular, the data protection agent (splitter) 144 intercepts IO for LU 1482a, it will split it to an IO to the DPA. The DPA exposes a special target device which intercepts this target IO, but this device is not 1482a. The splitter then sends the IO to 1482a.

Grid copy 1 runs on the DPA 112b and the DPA 112b is configured to receive splitter IOs for LU 2 1482c and LU 3 1482d, (in some other examples grid copy 0 and grid copy 1 may run on the same DPA, for example, DPA 112a. In this case DPA 112a will be configured to receive IOs to LU 1,LU 2,LU 3 and LU 4). The protection agent 144 discovers LUs the LUs DPAs 112a and 112b and discovers to which DPA it has to forward IOs for LUs 1482a-1482d. For example, if the protection agent 144 attempts to send IOs for LU 3 1482d to DPA 112a, DPA 112a will fail (e.g., by sending an SCSI fail status) on receipt of the IOs and the protection agent 144 will look to another DPA.

Figure 15:
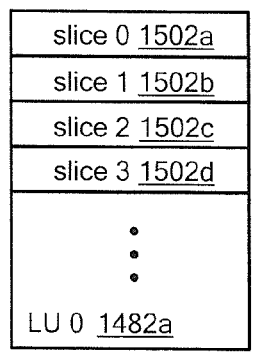
FIG. 15 is diagram of logical unit with slices.

Referring to FIG. 15, the LU 1482a-1482d may be divided into slices. For example, LU 1482a includes a slice 0 1502a, a slice 1 1502b, a slice 2 1502c, a slice 3 1502d and so forth, each slice has a predetermined number of blocks. In one example each slice has 2048 blocks. In one particular example when there are two grid copies, for n slices, the grid copy 0 may handle even slices (e.g., slice 0, slice 2, slice 4, . . . , slice 2n−2) while grid copy 1 may handle odd slices (e.g., slice 1, slice 3, . . . , slice 2n−1). In one example, slices 1502a-1502d are each 1 MB (2048 blocks). In other example, IOs that cross slices boundaries 1502a-1502d are split according to slice boundaries.

Bookmark Creation

Figure 16:
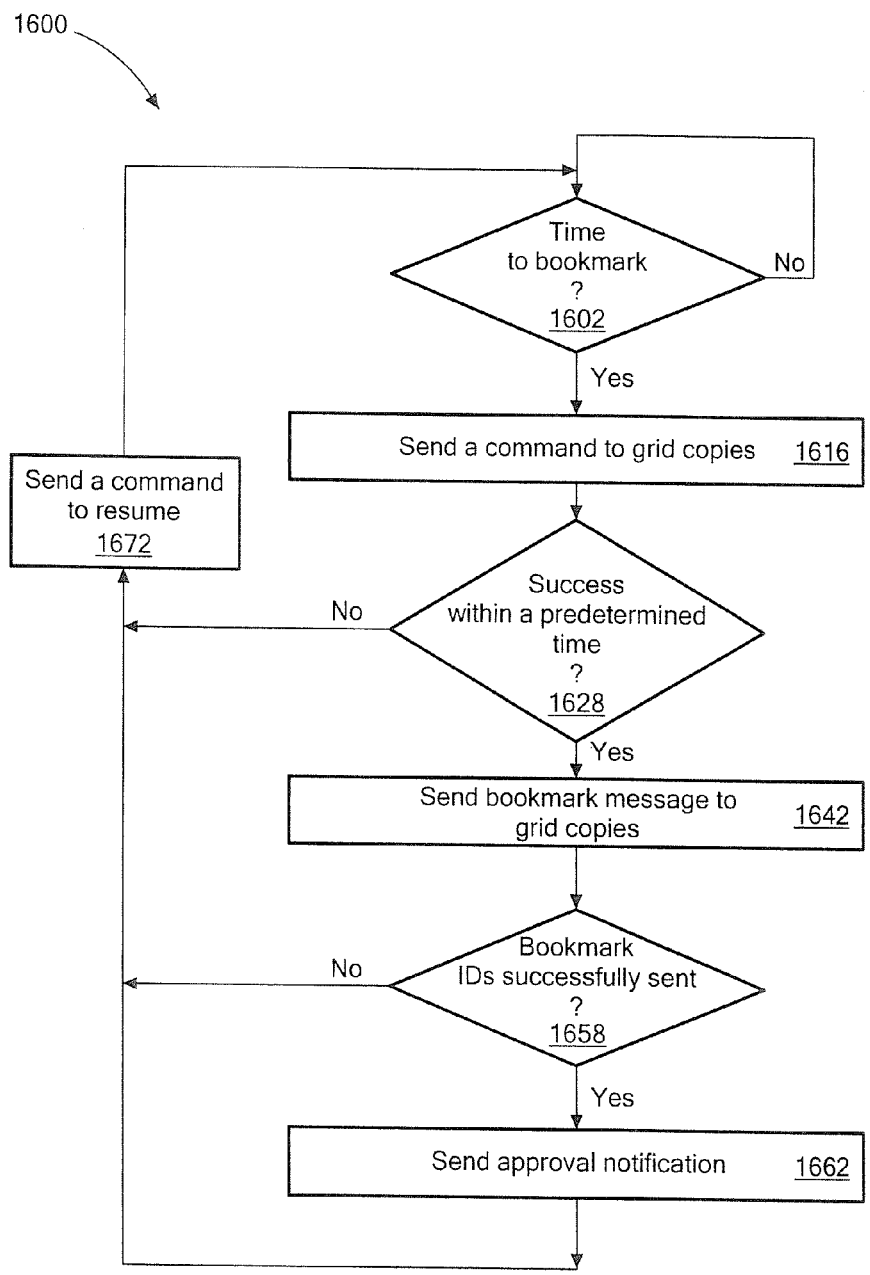
FIG. 16 is a flowchart of an example of a process to perform bookmarking on one grid copy.

Referring to FIG. 16, bookmarking is performed using a bookmark ID instead of using a timestamp because each copy may have different timestamps (e.g., the timestamp of the bookmark may be different between grid copies). In one example, the DPA 112a running the grid copy 0 performs the bookmarking. In one particular example, a process 1600 is used to bookmark. Process 1600 determines if it is time to bookmark (1602). For example, a bookmark is performed every 10 seconds. If it is time to bookmark, process 1600 sends a command to each of grid copies (1616). In other example, the user may also create a bookmark in the same way (e.g., by calling a command which will run a process to create a bookmark). In one example, grid copy 0 sends a command to each of the grid copies (including the grid copy 0) to stop acknowledging and copying IOs. If successful (e.g., a return message acknowledging receipt of the message) within a predetermined time (e.g., 2 seconds) (1628), process 1600 sends a bookmark message with a unique bookmark ID to the grid copies (1642). For example, the grid copy 0 sends a bookmark ID to the all grid copies (including grid copy 0).

Process 1600 determines if the bookmark IDs reached the grid copies (1658). For example, each of the grid copies acknowledges that the bookmark ID was received. If the bookmark IDS were successfully received by the grid copies, process 1600 sends an approval notification that the bookmark ID is approved (1662).

Process 1600 sends a command to the grid copies to resume acknowledging and copy IOs (1652). In one example, the resume command may be sent together with the approve command. For example, DPA 112a sends a command to the grid copies to resume acknowledging and copying IOs.

Figure 17:
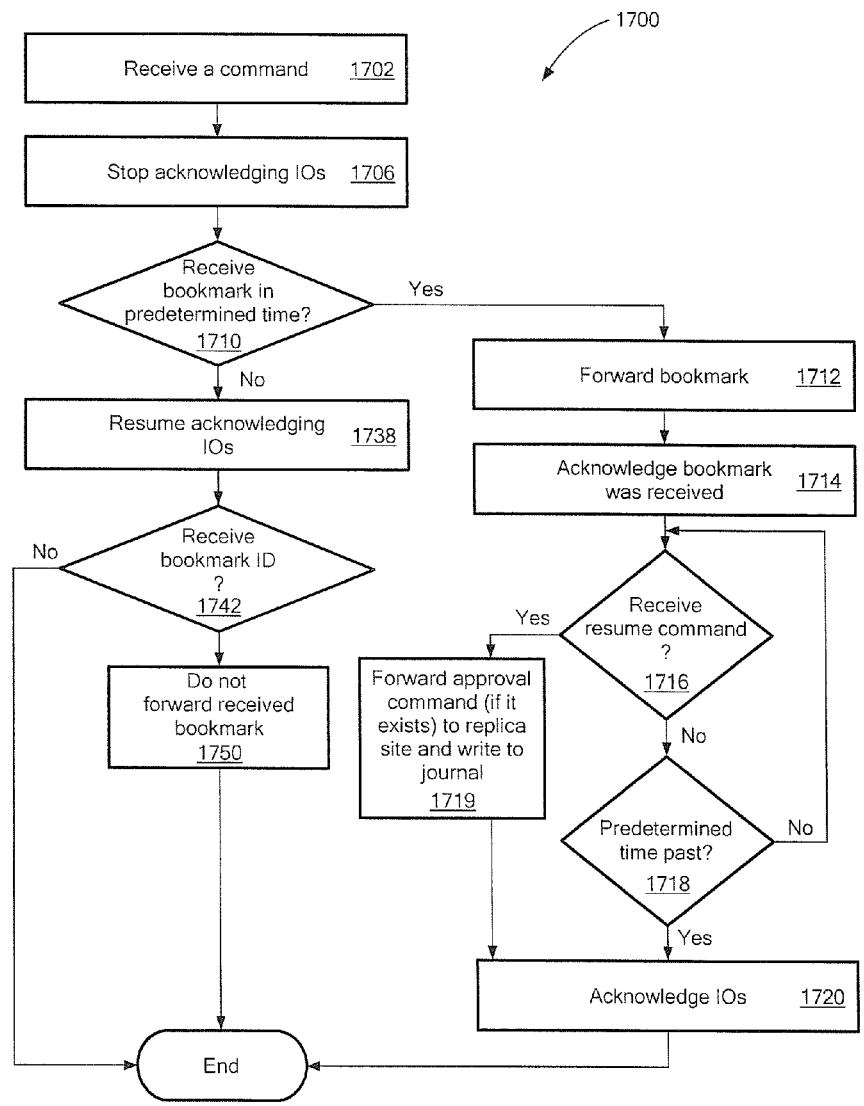
FIG. 17 is a flowchart of an example of a process to perform bookmarking at the remaining grid copies.

Referring to FIG. 17, each grid copy performs a process to receive the bookmark IDs, for example, a process 1700. Process 1700 receives a command (1702). For example, the grid copies receive a command (e.g., from processing block 1616) to stop acknowledging IOs and the grid copies then stop acknowledging IOs (e.g., to the protection agent 144 (splitter)) (1706). Process 1700 determines if the bookmark ID is received in a predetermined amount of time (e.g., 2 seconds) (1710).

If the bookmark ID is received in a predetermined amount of time, the grid copy forwards the bookmark ID to the replica and its corresponding journal (1712) and acknowledge that bookmark was received successfully (1714), for example, to grid copy 0.

Process 1700 determines if the resume command was received (1716) (e.g., a resume command from processing block 1672) or a predetermined amount of time has past (1718). If the resume command is received at a grid copy with approval (e.g., approval command from processing block 1652) of the bookmark, and the grid copy is still delaying the acknowledgments, the approval command will be forwarded to the replica site and written to the journal (1719). If there is no approval or approval arrived after the timeout the approve command will not be sent to the replica site, process 1700 then resumes acknowledging IOs arriving from the protection agent 144 (1720).

If the bookmark ID is not received in a predetermined amount of time or the predetermined amount of time has passed after the bookmark was received, process 1700 resumes acknowledging IOs (1738). For example, the grid copy resumes acknowledging IOs to the data protection agent 144. Process 1700 determines if the bookmark ID has been received (1742) and if the bookmark ID is received, process 1700 does not forward the bookmark ID (e.g., forward the bookmark ID to its journal) (1750) and notifies grid copy 0 that bookmark creation failed.

A bookmark created this way is valid, if the bookmark is approved in the journal for each grid copy (i.e., the approve command arrived to the journal). In one example, it may be that some copies received the unique bookmark ID while other copies already started acknowledging IOs, and in this example the approval of the bookmark will not arrive for at least one grid copy and the bookmark will not be valid.

In one example, bookmarking is similar to bookmarking taught in U.S. Pat. No. 7,577,867 titled "Cross Tagging to Data for Consistent Delivery" which is incorporated herein in its entirety.

Load Balancing

Figure 18:
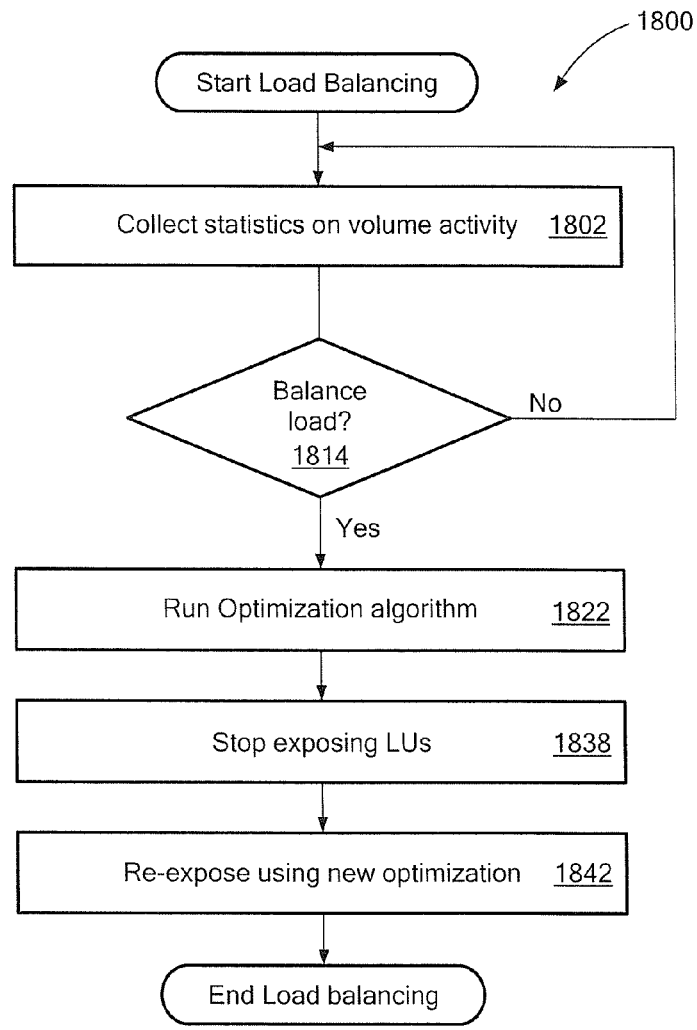
FIG. 18 is a flowchart of an example of a process to perform load balancing.

Referring to FIG. 18, load balancing may be used for further optimization. For example, the technique described in FIGS. 14 and 15 can be further enhanced using a load balancing technique such as a load balancing techniques exemplified by a process 1800. Process 1800 collects statistics for each LU replicated (1802). The statistics include the throughput and IO/sec for each LU at a certain granularity (e.g., an average throughput and IO/sec for every minute in the last week), Process 1800 determines if a load should be balanced (1814). In one example, the determination is based on time. In another example, the determination is based on whether a request for the balance occurs, for example, by a user or an application.

If load balancing is requested, process 1800 runs an optimization algorithm (1822). In one example, the optimization algorithm determines which LUs are exposed (i.e., made available) by which grid CG.

Process 1800 stops exposing (i.e., making available) the LUs exposed by the grid copies (1838) and re-exposes the LU using a new optimization. For example, using the example in FIG. 14, instead of the DPA 112a receiving IOs for LU 1, the DPA 112b receives IOs for LU 1 if it is determined that it is more efficient based on the optimization algorithm.

Initialization

A delta marking stream is kept to track changes in each grid copy. In one example, each grid copy keeps a delta marking stream and tracks IOs arriving to the DPA, i.e. if currently LU 1 and LU 2 are exposed to the splitter by grid copy 0 then all IOs arriving to LU 1 and LU 2 will be tracked in the delta marking stream of grid copy 0, and if LU 3 and LU 4 are exposed by grid copy 1, all IOs arriving to LU 3 and LU 4 are tracked in the delta marking stream of grid copy 1. When a flush of marking data is requested, each grid copy flushes data to a disk. In one example, "partial release" information is kept separately in each delta marker of each grid copy (i.e., grid copy 0 delta mark will keep the partial release information for all grid copies which are relevant in the delta marking stream of grid copy 0 and grid copy 1 will keep partial marking information relevant for all grid copies which are relevant in delta marking stream of grid copy 1. In another example, only grid copy 0 maintains the delta marking stream but each grid copy sends the IOs metadata to the grid copy 0 and the grid copy 0 flushes the data to the journal.

Initialization is similar to initialization that has been described herein; however, if each grid copy maintains a delta marking stream, then each grid copy reads delta marking information relevant to it from each of the other grid copies.

Image Access

User may choose bookmark, the bookmarks presented to the user are only approved bookmarks which reach all the grid copies, the point in time presented for the bookmark is the point in time of grid copy 0, user may also search bookmark by time, but the only available bookmarks will be approved bookmarks which reached all grid copies. User may access the bookmark in logged or virtual access mode. In one example, after the image is created IOs will arrive at grid copy 0, which will forward the IOs to the correct grid copy and split to several grid copies if the IO crosses slice boundaries. In another example, each grid copy may expose some of the LUs, for example grid copy 0 may expose LU 1, LU 2 and grid copy 1 may expose LU 3 and LU 4, in this example if system is in virtual access mode all reads and write to LU 3 will be forwarded by the protection agent the appliance running grid copy 1, and all reads and writes to LU 1 will be forwarded to the appliance running grid copy 0, each grid copy receiving the IO from the splitter will forward the IO to the correct grid copy according to the offset of the IO (and if the IO crosses slice boundaries, IO will be split to several IOs each handled by a different grid copy). If the system, in this example, is in a logged access mode, writes to LU 3 will be forwarded by the protection agent 144 to the appliance (DPA) running grid copy 1, and all writes to LU 1 will be forwarded by the protection agent to the appliance running grid copy 0, each grid copy receiving the IO from the protection agent will forward the IO to the correct grid copy according to the offset of the IO (and if the IO crosses slice boundaries, IO will be split to several IOs each handled by a different grid copy).

Figure 19:
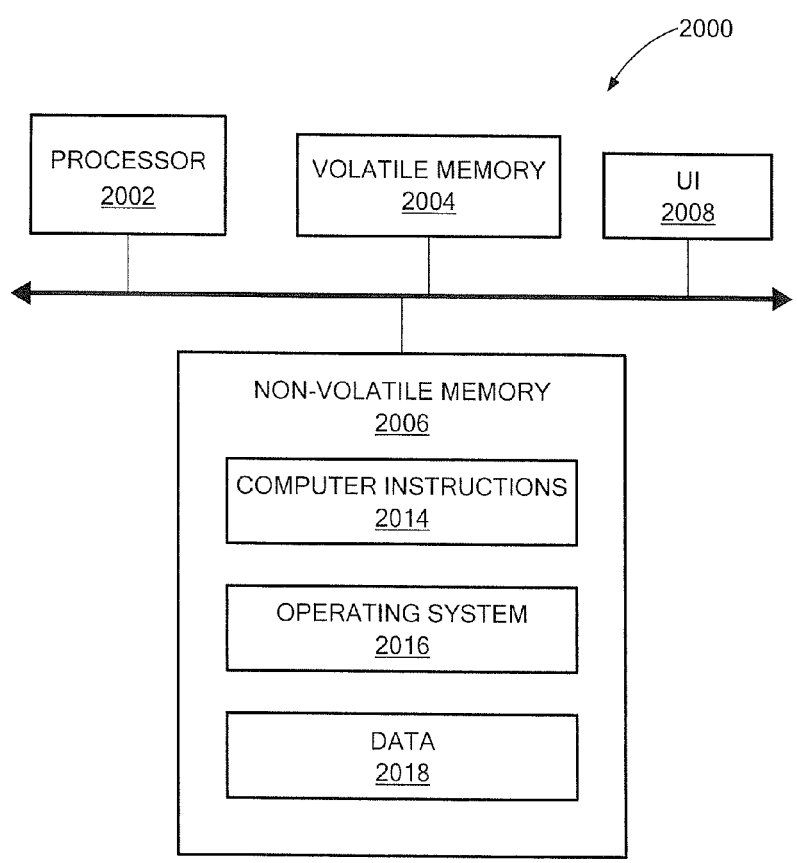
FIG. 19 is a computer on which any of the processes of FIGS. 16 to 18 may be implemented.

Referring to FIG. 19, a computer 2000 includes a processor 2002, a volatile memory 2004, a non-volatile memory 2006 (e.g., hard disk) and a user interface (UI) 2008 (e.g., a mouse, a keyboard, a display, touch screen and so forth). The non-volatile memory 2006 stores computer instructions 2014, an operating system 2016 and data 2018. In one example, the computer instructions 2014 are executed by the processor 2002 out of volatile memory 2004 to perform all or part of the processes described herein (e.g., processes 1600, 1700, 1800).

The processes described herein (e.g., processes 1600, 1700, 1800) are not limited to use with the hardware and software of FIG. 19; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes.

The processes described herein are not limited to the specific examples described. For example, the processes 1600, 1700, 1800 are not limited to the specific processing order of FIGS. 16 to 18, respectively. Rather, any of the processing blocks of FIGS. 16 to 18 may be re-ordered, combined or removed, performed in parallel or in serial, as necessary, to achieve the results set forth above.

The processing blocks in FIGS. 16 to 18 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:
1. A method, comprising:
forming a virtualized grid consistency group to replicate logical units using a processor, the virtualized grid consistency group comprising a first grid copy and a second grid copy;
running the first grid copy on a first data protection appliance (DPA);
running the second grid copy on a second DPA;
splitting to the first DPA input/output requests (IOs) intended for a first subset of the logical units; and
splitting to the second DPA IOs intended for a second subset of the logical units different from the first subset of logical units.
2. The method of claim 1, further comprising:
receiving IOs at the first DPA intended for a logical unit of the first subset;
checking an offset of an IO;
forwarding the IO to the first grid copy if the offset of the IO belongs to a first set of offsets; and
sending the IO to the second grid copy for handling if the offset of the IO is in the second set of offsets.
3. The method of claim 2, further comprising:
dividing the logical units into slices; and
splitting IOs according to slice boundaries for the offsets of the IO that cross slice boundaries.
4. The method of claim 1, further comprising generating a unique bookmark based on an ID.
5. The method of claim 4, wherein generating a unique bookmark ID comprises generating a unique identification (ID) based on one of a user request or an amount of time.
6. The method of claim 4 wherein generating a bookmark comprises:
sending a command from the first grid copy to each of the grid copies to cease acknowledging IOs; and after the command is acknowledged:
sending a bookmark with the unique ID from the first grid copy to each grid copy, and
sending a resume command to acknowledge IOs with an approval of the bookmark if all bookmarks are acknowledged.
7. The method of claim 6, further comprising:
receiving at a grid copy the command from the first grid copy to cease acknowledging IOs;
ceasing acknowledging IOs;
determining if the bookmark with the unique ID is received in a predetermined amount of time;
forwarding the bookmark with the unique ID to a journal;
sending a status of the bookmark command to the first grid copy;
determining if a resume command with approval of the bookmark with the unique ID is received in a predetermined amount of time;
forwarding the approval with the unique ID to a journal; and
resuming acknowledging the IOs.
8. The method of claim 7, further comprising:
resuming acknowledging IOs if the bookmark with the unique ID is not received at a grid copy in the predetermined amount of time; and preventing forwarding of the bookmark and the approval command with the unique ID.

9. The method of claim 1, further comprising:
collecting status of the activity of the logical units (LUs);
performing an optimization algorithm; and
determining LU list which a grid copy should expose.

10. The method of claim 9, further comprising:
ceasing exposing logical units by the first and second grid copies;
re-exposing the logical units based on the optimization algorithm.

11. The method of claim 1, further comprising:
using the first grid copy to maintain a first delta marking stream;
using the second grid copy to maintain a second delta marking stream;
receiving a request to flush data from the first and second marking streams;
using the first grid copy to flush data from the first delta marking stream to a disk; and
using the second grid copy to flush data from the second delta marking stream to the disk.

12. The method of claim 1, further comprising:
using the first grid copy to maintain a first delta marking stream;
receiving a request to flush data from the first delta marking stream;
receiving at the first grid copy marking data from the second grid copy; and
using the first grid copy to flush data from the first delta marking stream to a disk.

13. The method of claim 1, further comprising reading a delta marking stream from the first and second grid copies.

14. The method of claim 1, further comprising:
using bookmarks approved by each grid copy;
verifying that bookmark are for the same point in time according to the bookmark unique ID; and
presenting a time of the bookmark stored on the first grid copy.

15. The method of claim 1, further comprising:
exposing the logical units to a point in time requested by a user in logged access mode;
rolling all copies to the point in time the user requested;
exposing a set of logical units for each grid copy; and
forwarding the write IO request to a correct grid copy.

16. The method of claim 1, further comprising:
creating a virtual access point for the first and second grid copies;
exposing a set of logical units for each grid copy; and
forwarding the read and write IO requests to a correct grid copy.

17. An article comprising:
a non-transitory machine-readable medium that stores executable instructions, the instructions causing a machine to:
form a virtualized grid consistency group to replicate logical units, the virtualized grid consistency group comprising a first grid copy and a second grid copy;
run the first grid copy on a first data protection appliance (DPA);
run the second grid copy on a second DPA;
split to the first DPA input/output requests (IOs) intended for a first subset of the logical units; and
split to the second DPA IOs intended for a second subset of the logical units different from the first subset of logical units.

18. The article of claim 17, further comprising instructions causing the machine to:
receive IOs at the first DPA intended for a logical unit of the first subset;
check an offset of the IO;
forward the IO to the first grid copy if the offset of the IO belongs to a first set of offsets; and
send the IO to the second grid copy for handling if the offset of the IO is in the second set of offsets.

19. An apparatus, comprising:
circuitry to:
form a virtualized grid consistency group to replicate logical units, the virtualized grid consistency group comprising a first grid copy and a second grid copy;
run the first grid copy on a first data protection appliance (DPA);
run the second grid copy on a second DPA;
split to the first DPA input/output requests (IOs) intended for a first subset of the logical units; and
split to the second DPA IOs intended for a second subset of the logical units different from the first subset of logical units,
wherein the circuitry comprises at least one of a processor, a memory, programmable logic and logic gates.

20. The apparatus of claim 19, further comprising circuitry to:
receive IOs at the first DPA intended for a logical unit of the first subset;
check an offset of the IO;
forward the IO to the first grid copy if the offset of the IO belongs to a first set of offsets; and
send the IO to the second grid copy for handling if the offset of the IO is in the second set of offsets.

* * * * *